United States Patent [19]

Kim

[11] Patent Number: 5,420,895

[45] Date of Patent: May 30, 1995

[54] PHASE COMPENSATING CIRCUIT

[75] Inventor: Duck H. Kim, Kyungki-do, Rep. of Korea

[73] Assignee: Samsung Electronics Co., Ltd., Kyungki-do, Rep. of Korea

[21] Appl. No.: 24,013

[22] Filed: Mar. 1, 1993

[30] Foreign Application Priority Data

Feb. 29, 1992 [KR] Rep. of Korea .................. 92-3387

[51] Int. Cl.⁶ .................. H04M 15/00; H04N 5/00
[52] U.S. Cl. .................. 375/373; 375/368; 370/105.3; 348/537
[58] Field of Search .................. 375/106, 110–111, 375/114, 116, 118–119; 370/100.1, 105.1, 105.3, 105.5, 108; 348/505, 507–508, 536–537, 541; 307/269; 328/53, 63, 72

[56] References Cited

U.S. PATENT DOCUMENTS

| | | | |
|---|---|---|---|
| 4,414,676 | 11/1983 | Kraul et al. | 375/116 |
| 4,819,251 | 4/1989 | Nelson | 375/119 |
| 4,876,699 | 10/1989 | Nelson | 375/119 |
| 5,018,140 | 5/1991 | Lee et al. | 370/105.1 |
| 5,134,637 | 7/1992 | Beyer et al. | 375/119 |

FOREIGN PATENT DOCUMENTS 230292 1/1990 Japan .

*Primary Examiner*—Stephen Chin
*Assistant Examiner*—Young Tse
*Attorney, Agent, or Firm*—Sughrue, Mion, Zinn, Macpeak & Seas

[57] ABSTRACT

A phase compensating circuit in a video signal processing system utilizing a frequency folding technique which requires the recovery of an exact sampling phase is disclosed. A predetermined pattern is inserted during an encoding operation, and the frequency of the inserted pattern is discriminated during a decoding. During this process, when a comparison is made as to whether the original phase lies at the front or at the rear of the received phase, the comparison is not made with an exact value, but with a predetermined range of values by taking into account the inherent variability in delay values, for example, due to temperature variations, of delaying devices of a clock adjusting part. In this regard, the sum total of the delays of the delaying devices is made to include one clock period by taking into account the temperature characteristics of the delaying devices, with the result that clocks having a relatively exact phase can be generated based on the pattern inserted during an encoding.

7 Claims, 6 Drawing Sheets

PHASE COMPENSATING CIRCUIT

FIELD OF THE INVENTION

The present invention relates to a video signal processing circuit which is based on a muse method, an HDTV method and the like, and adopts a frequency folding technique requiring an accurate sampling point, and particularly to a phase compensating circuit in which a particular recognition pattern is input during an encoding process at the transmitting end, so that the original phase of the frequency can be relatively accurately retrieved during a decoding at the receiving end, i.e., an analogue-to-digital conversion.

BACKGROUND OF THE INVENTION

Generally, in a signal processing circuit requiring the recovery of an exact phase, and particularly, when frequency-folded signals are involved, modulated signals and high frequency signals are subjected to analog-to-digital conversion at the receiver, and an exact phase has to be recovered.

For example, according to Japanese Patent Laid-Open Publication No. 2-30292, clocks phase-synchronized with sampling clocks of the transmitting end are synchronized with the phase of the receiving end.

That is, first phase reference signals, which are synchronized with color subcarriers and sampling clocks for predetermined samples of the clocks of the transmitting path, are transmitted after sampling them. Then, at the receiving end, the received signals are phase-compared with second phase reference signals which are generated from a regenerating clock, thereby synchronizing the first sampling clock of the transmitting end with the second sampling clock of the receiving end. As a result, the color burst phase of the television signals regenerated at the receiving end is made to be synchronized with the color burst of the television signals of the transmitting end by carrying out digital-to-analog conversions by means of the sampling clocks which are phase-synchronized with the sampling clocks of the transmitting end.

Meanwhile, in the case where a large amount of images has to be sent to a predetermined band as in the case of HDTV, the muse method (Multiple Sub-Nyquist Sampling Encoding), high quality VTR and the like, the frequency folding technique is widely used. In such a case, a pattern of phase, used to synchronize the phases of signals at the encoding and decoding ends, can be inserted at the encoding end, and, in the case of VTR, it can be applied to a regenerating circuit.

However, when analogue signals are converted to digital signals by sampling them at the receiving end, if the frequency of signals is lower than the sampling frequency, errors occur in small amounts during the sampling, while, if the frequency of signals is higher, then errors occur in large amounts. Therefore, if the sampling point is to be exactly located, a recognition pattern has to be loaded on the signals at the transmitting end, so that a method for recovering an exact phase at the receiving end can be used based on the inserted recognition pattern. In currently used VTRs, the frequency of signals is lower than the sampling frequency, and therefore, errors occur in small amounts, so that there is no major problem. However, if the band is to be expanded based on the frequency folding method, the frequency of signals become high, when compared to the sampling frequency, with the result that the problem of errors becomes serious.

That is, in the case where the frequency is low as shown in FIG. 1A, the sampling point of data is not significantly displaced, so that no major problem should occur. However, if the frequency is high as shown in FIG. 1B, the sampling point of data is significantly displaced, so that errors occur in large amounts, and that it is highly probable that signals will be erroneously recognized as completely different kinds of signals by the receiving end.

SUMMARY OF THE INVENTION

The present invention is intended to overcome the above described disadvantages of the conventional techniques.

Therefore it is an object of the present invention to provide a phase compensating circuit to be used at a decoding end in which a predetermined recognition pattern is inserted into a part of a signal having no video signals during an encoding at the encoding end, then a determination is made at the decoding end as to whether the pattern is a pattern for correcting a phase, and then, the relative slowness and fastness of the phase of the signals and the phase of the inserted pattern are discriminated, thereby adjusting the phase at the decoding end.

In achieving the above object, the phase compensating circuit, which is a signal processing system for compensating the phase during a decoding by inserting the predetermined recognition pattern during an encoding, includes a pattern recognizing part for recognizing a pattern inserted during an encoding, a code converting part connected to the pattern recognizing part, for providing the signals of the pattern recognizing part in the form of signless signals, a comparing part connected to the code converting part, for providing lead or lag pulses by comparing the magnitudes of three adjacent pixels and the magnitudes of positive or negative threshold values, a clock adjustment controlling part connected to the comparing part for providing clock lagging or clock leading signals by counting the lead or lag pulses by the comparing part, and a clock adjusting part connected to the clock adjustment controlling part for adjusting the phase of a clock by utilizing delaying devices in accordance with the clock leading or clock lagging signals of the clock adjustment controlling part.

BRIEF DESCRIPTION OF THE DRAWINGS

The above object and other advantages of the present invention will become more apparent by the following detailed description of the preferred embodiment of the present invention with reference to the attached drawings in which.

DESCRIPTION OF THE PREFERRED EMBODIMENTS

Figure 2:
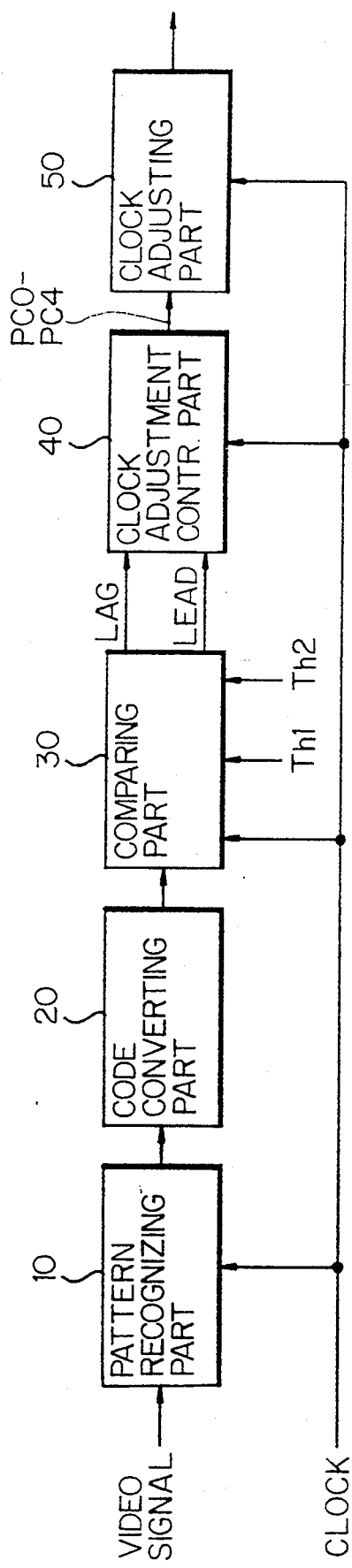
FIG. 2 is a block diagram showing the constitution of a preferred embodiment of the phase compensating circuit according to the present invention.

FIG. 2 illustrates the phase compensating circuit at the decoding end according to the present invention.

A code converting part 20 is connected to, so as to receive an input from, a pattern recognizing part 10 which recognizes a predetermined pattern inserted during an encoding. Thus, the part 20 converts the pattern-recognized signals to the signless signals.

The code converting part 20 is connected to, so as to provide an output to, a comparing part 30 which generates lead or lag pulses upon comparing the magnitudes of three sampled adjacent pixels A, B and C, and the magnitudes of positive and/or negative threshold values Th1 and Th2. Meanwhile, the comparing part 30 is connected to, so as to provide an output to, a clock adjustment controlling part 40 which generates clock lagging or clock leading signals after counting the lead or lag pulses output from the comparing part 30.

Further, the clock adjustment controlling part 40 is connected to, so as to provide an output to, a clock adjusting part 50 which adjusts the clock phase by utilizing delaying devices in accordance with the clock leading or clock lagging signals output from the clock adjustment controlling part 40.

Figure 4:
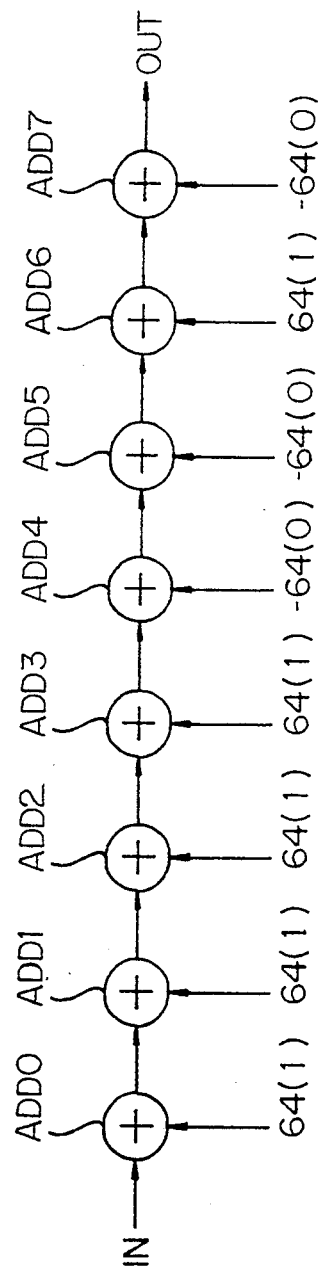
FIG. 4 is a detailed circuit illustrating the recognizing part of FIG. 2.

FIG. 4 is a detailed illustration of the pattern recognizing part 10 which includes a plurality of adders ADD$\phi$~ADD7 connected in series.

Figure 5:
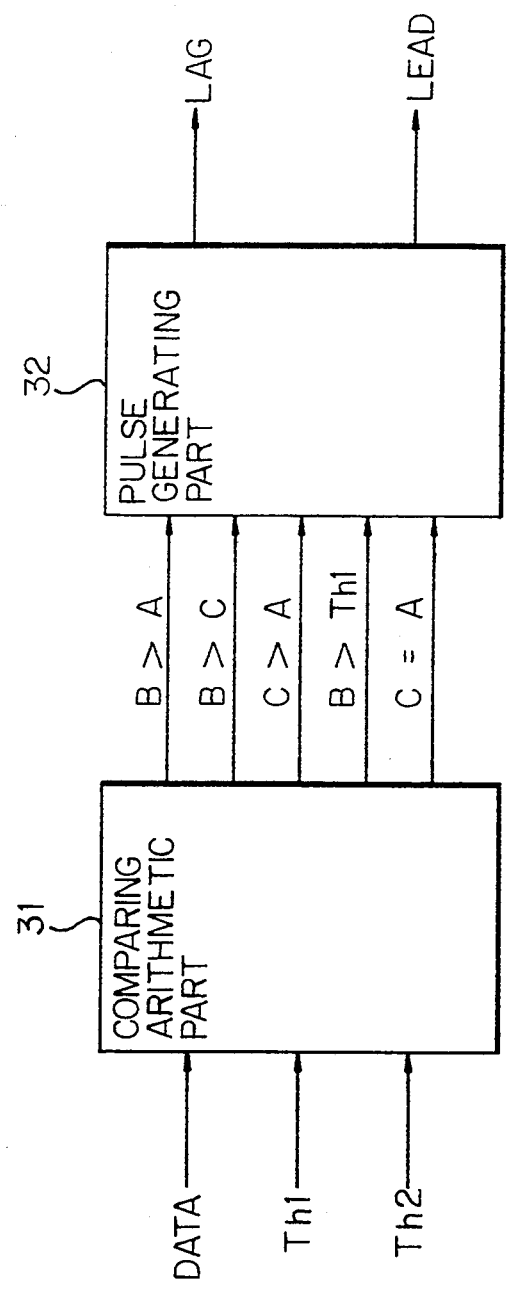
FIG. 5 is a detailed block diagram of the comparing part of FIG. 2.

FIG. 5 is a block diagram of the comparing part 30. A pulse generating part 32 is connected to a comparing arithmetic part 31 which compares the magnitudes of three adjacent pixels A, B and C (see FIGS. 6A–6D), and the magnitudes of the positive and/or negative threshold values Th1 and Th2, so that the pulse generating part 32 can generate lead or lag pulses in accordance with the compared results.

Figure 7:
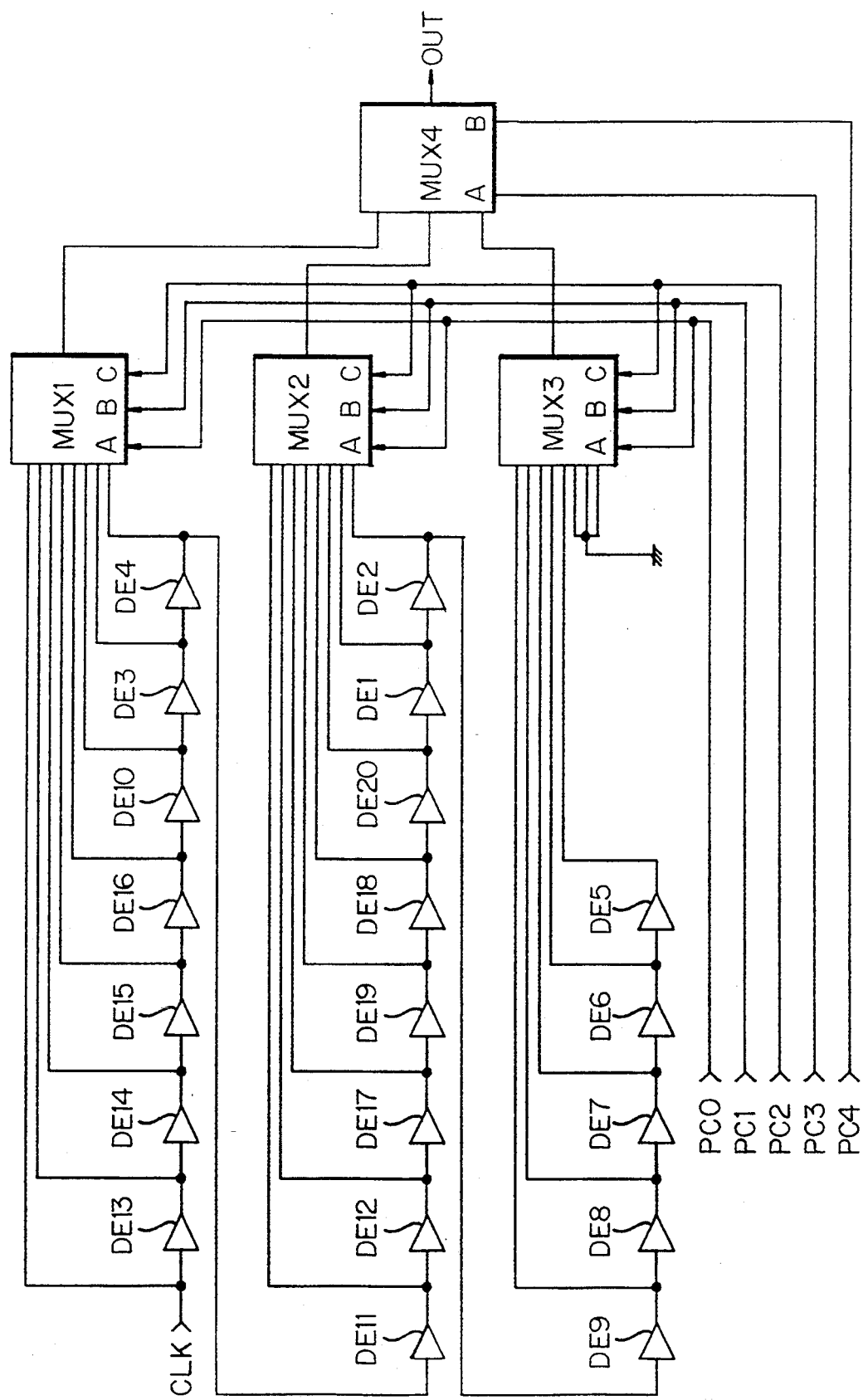
FIG. 7 is a detailed circuit illustrating the clock adjusting part of FIG. 2.

FIG. 7 is a detailed illustration of the clock adjusting part 50 which is basically a variable delay setting circuit and which includes a plurality of delaying devices DE1-DE20 and a plurality of multiplexers MUX-1-MUX4, and which generates clock signals corresponding to the clock leading or clock lagging signals output from the clock adjustment controlling part 40.

Figure 9:
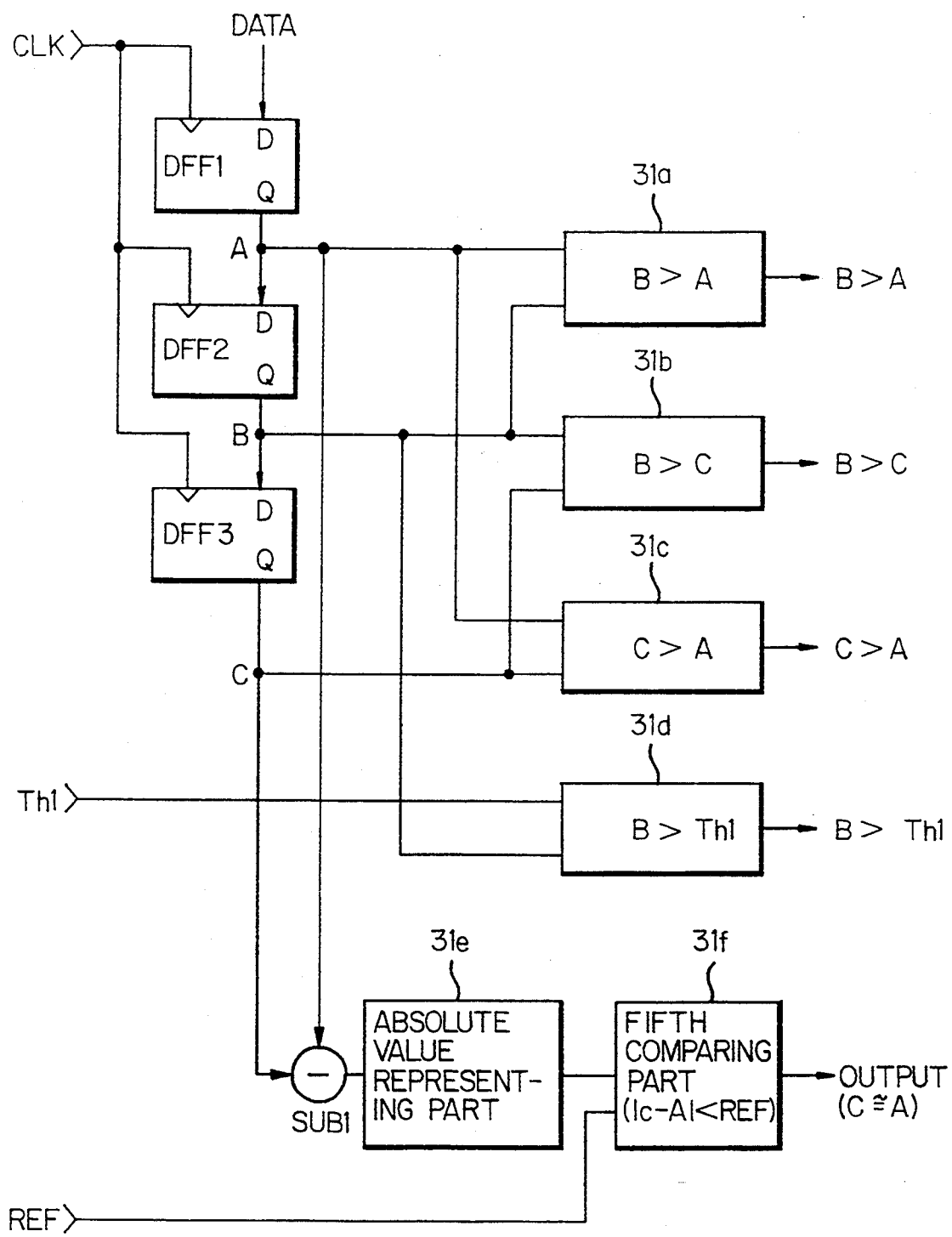
FIG. 9 is a detailed block diagram of the comparing arithmetic part of FIG. 2.

FIG. 9 is a detailed block diagram of an embodiment of the comparing arithmetic part 31 of FIG. 5.

A first comparing part to a fourth comparing part 31a~31d are connected to a plurality of D flip-flops DFF1~DFF3 which delay input data according to an input clock CLK. This enables three time-adjacent samples A, B and C to be available at the outputs of DFF1~DFF3, respectively. The magnitudes of the outputs from the D flip-flops DFF1~DFF3 and the positive threshold value Th1 are compared by the comparing parts 31a-31d. The outputs of DFF1 and DFF3 are input to respective inputs of a subtracter SUB1 so as to obtain the difference of outputs A and C from the D flip-flops DFF1~DFF3. An absolute value representing part 31e is connected to the subtracter SUB1 and generates the absolute value of the output from the subtracter SUB1. Also, a fifth comparing part 31f compares the output of the absolute value representing part 31e with a reference value ref. The reference value ref is a variable value of data for once delay, and is set so that the output from the fifth comparing part 31f is approximately C=A. In this embodiment, the positive threshold TH1 is used as a comparison output. In other embodiments, the negative threshold TH2 could be used.

Figure 3:
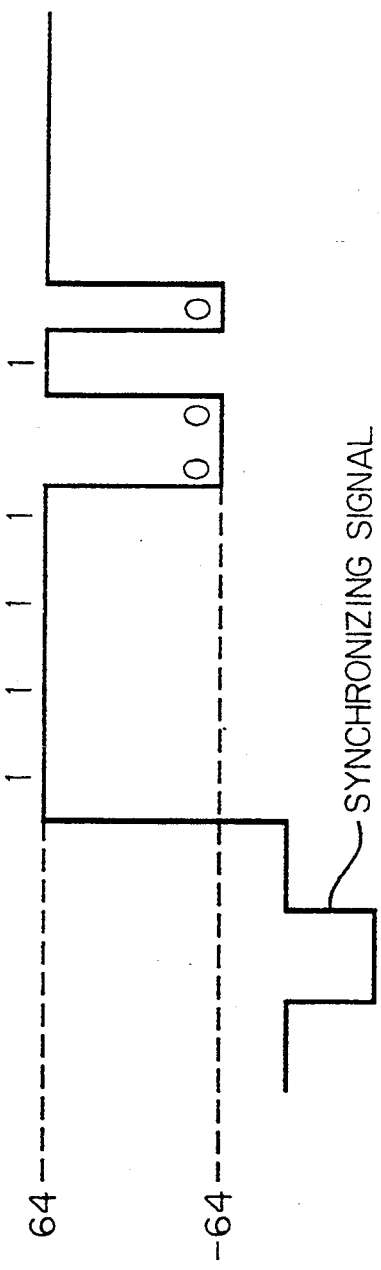
FIG. 3 illustrates an example of a pattern used in the present invention.

In the circuit of the present invention constituted as described, if a pattern of "11110010" is inserted during an encoding of video signals, and if the digital value 64 is assumed to be 1 and $-64$ is assumed to be 0, the received waveform at the decoding end becomes as shown in FIG. 3.

When the resultant signals are passed through the pattern recognizing part 10 of FIG. 4, a correlation operation is performed to make a determination of whether the input pattern is equal to the reference pattern 11110010. That is, a maximum correlation value is obtained in the case of the input to circuit 10 being 11110010, while a slightly smaller value is given in similar cases, i.e., where the input is not exactly 11110010, but a similar pattern.

The signals which have passed through the pattern recognizing part 10 are supplied to the code converting part 20 where the supplied signals are converted to signless signals, before being supplied to the comparing part 30. Then comparisons of patterns are carried out by the comparing part 30, and after carrying out samplings, the signals take the forms of FIGS. 6A, 6B and 6C. In case of FIG. 6D, if the waveform is smaller than the negative threshold value Th2, it is recognized as a pattern. While, if it is in between the positive threshold value Th1 and the negative threshold value Th2, it is not recognized as a pattern.

In the operation of the code converting part 20, when it is said above that a conversion is made to signless codes, this means that signed data changes to signless data. This sign of ($-$) is produced, for example, in the opposite case of the pattern recognizing part 10 as in the case of 00000010 or 00000111.

Thus, if a pattern passes through the pattern recognizing part 10, the pattern comes to have the sign of ($-$). The reason for this comes from the fact that 64 is assumed to be 1, and $-64$ is assumed to be 0 in the above. The case of 11110010 which is taken as an example in the present invention similars to the pattern recognizing part 10, and therefore the pattern has the sign of ($+$), so that there should be no problem. However, in the case of the pattern recognizing part 10 which is taken as an example of giving the sign of ($-$), it will have the sign of ($-$) according to the method of the present invention, and therefore, the code converting part 20 converts the sign of ($-$) to a signless signal.

Figure 1A:
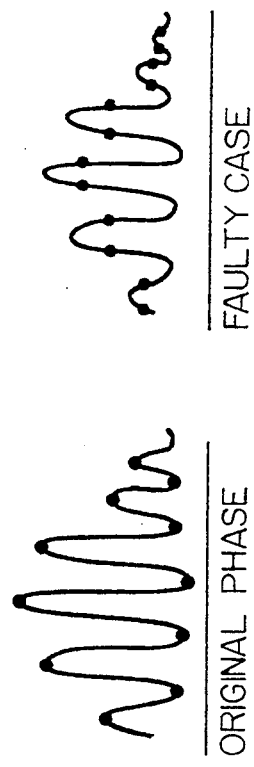
FIG. 1A illustrates a data sampling of a low frequency signal.
Figure 1B:
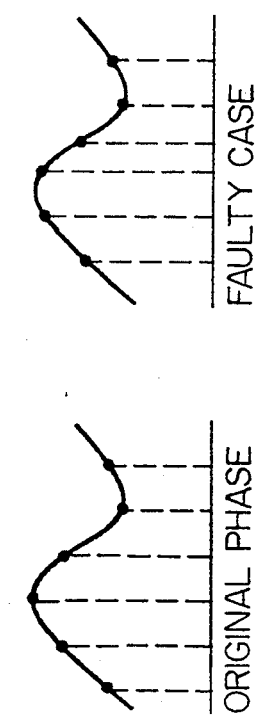
FIG. 1B illustrates a data sampling of a high frequency signal.
Figure 6A:
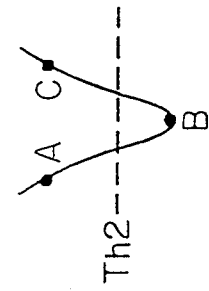
FIGS. 6A to 6D illustrate the waveforms of the sampled recognizing patterns.
Figure 6B:
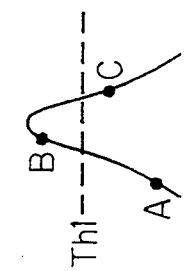
Figure 6C:
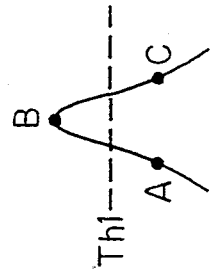
Figure 6D:
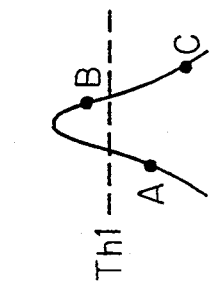

Then as shown in FIGS. 6A to 6C, the magnitudes of three adjacent pixels A, B and C of a sampled pattern are compared by the comparing arithmetic part 31.

That is, if "B" exceeds a predetermined value, it is recognized as a pattern, and then, is subjected to a clock adjustment. The comparing arithmetic part 31 compares the magnitudes between B and A, between B and C, between C and A, and between B and the positive threshold value Th1, by utilizing a plurality of comparators and adders.

If A>C as shown in FIG. 6(A), the clock at the decoder has to be made to lag, and, if A<C as shown in FIG. 6(C), the clock has to made to lead, while if A=C as shown in (B), it is decided that the phase of the decoder clocks corresponds exactly to the phase of the encoder clock, thereby excluding the need for a phase adjustment of the decoder clock.

However, it rarely happens that A and C exactly correspond to each other, that is, the delay of the delaying device cannot be said to have a true delay value, but instead the actual delay values of the delay devices are in a range around a certain center value. If the difference between A and C comes within a predetermined range of the frequency pattern which is inserted during an encoding operation, then it is decided that it is corresponded by taking into account the worst case of the delaying device of the phase adjusting part 50.

That is, if the predetermined range mentioned above is made to be too large, the phase becomes inexact, while, if it is made to be too small, the situation becomes to be difficult to approach to the desired decoding signals. Therefore the predetermined range has to be decided with a proper scale.

Meanwhile, the compared results of the comparing arithmetic part 31 are supplied to the pulse generating part 32 which provides, for example, a lag pulse if A>C, and provides a lead pulse if A<C.

Then the clock adjustment controlling part 40 adjusts the clocks of the clock adjusting part 50 in accordance with the output of the pulse generating part 32.

That is, a count value is increased if the pulse generating part 32 generates a lag pulse, and the count value is decreased if a lead pulse is generated, thereby adjusting the phase of clock. However, if the adjustment is made too frequently, the picture on the monitor can be oscillated, and therefore, the adjustments are made at intervals of several fields by holding the information. Meanwhile, the clock adjusting part 50 delays the clocks by an amount according to the number of the count values which are supplied from the clock adjustment controlling part 40.

Under this condition, the delaying devices DE1-DE20 which constitute the clock adjusting part 50 are affected by the ambient temperature so that they will vary within a known range between a best possible case (shortest total delay value) and a worst possible case (longest total delay value). Therefore, the total delay of the delaying devices DE1-DE20 has to be larger than 1 complete clock cycle under the best case. The best case in the above means that the sum total of the delays of the delaying devices DE1-DE20 has to be larger than 100 ns which is used as the system clock in the present invention. In FIG. 7, the sum total of the delays of the delaying devices DE1-DE20 is present at the output of DE5 and is greater than 100 ns, as shown in FIG. 8.

That is, the worst case, i.e., the case where delays are greatest, is that, when the sampling clock lies at an intermediate position, it pursues a true value (the desired clock provided during a decoding), and, if no more delay is permitted, the pursue fails.

Figure 8:
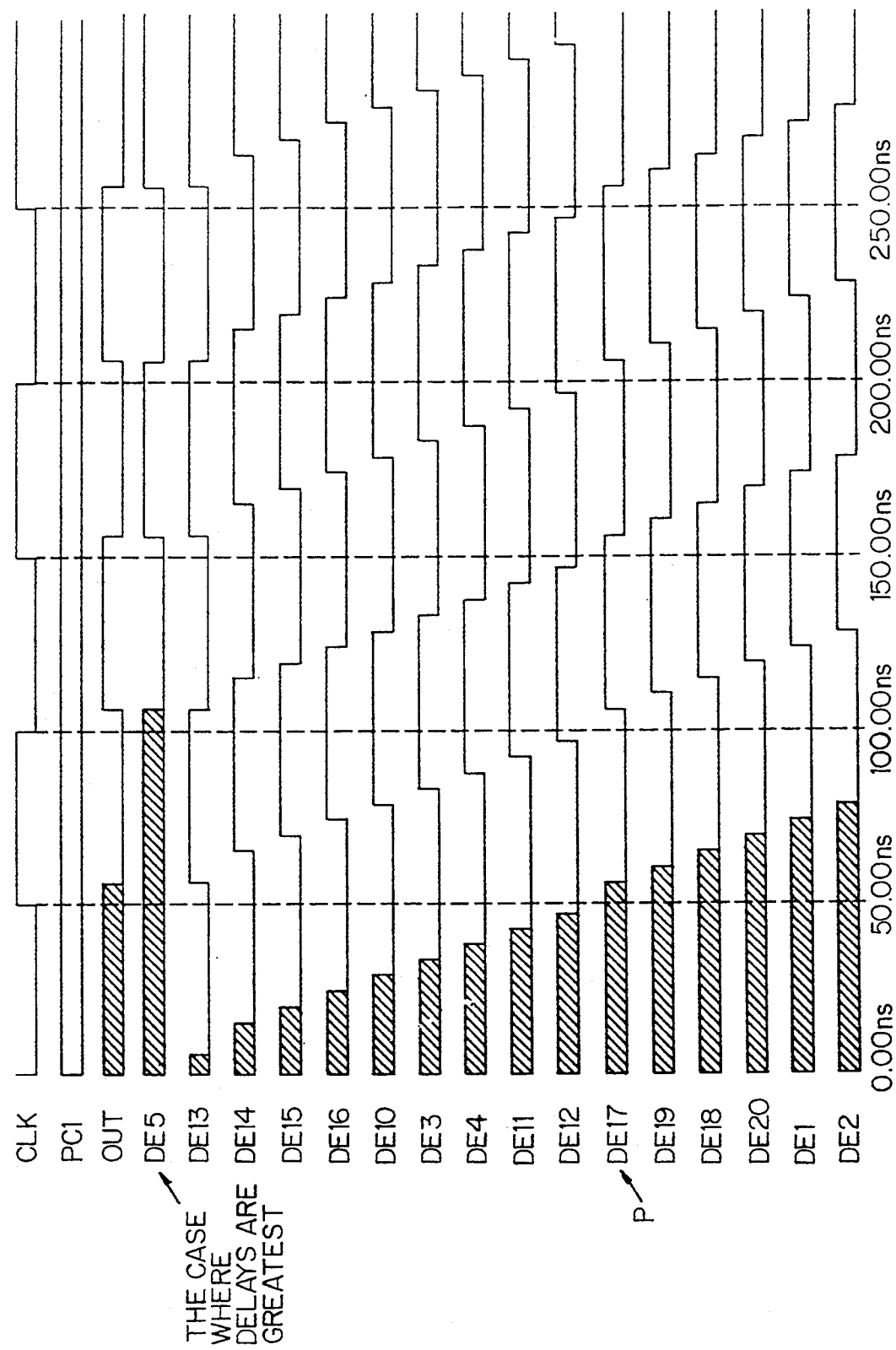
FIG. 8 illustrates the waveforms involved with the circuit of FIG. 7.

Meanwhile, the output of the clock adjustment controlling part 40 indicates the point P of FIG. 8, and it moves up and down in accordance with the operation of the circuit. That is, the clock adjustment controlling part 40 generates a control signal on lines PC0-PC4 and supplies the control signal to the clock adjusting part 50 at the location designated by lines PC0-PC4 in FIG. 7. Then, the multiplexers MUX1-MUX4 are controlled by the control signal on lines PC0-PC4 to select a particular input supplied from delay elements DE1-DE20. That is, the control signal on lines PC0-PC4 is supplied to the control inputs A, B and C of MUX1-MUX4 so that the output OUT of MUX4 will be an output of a particular one of DE1-DE20 which corresponds to the count value supplied from clock adjustment controlling part 40. Further, DE5 of FIG. 8 includes 100 nsec which is one period cycle of the clock.

According to the present invention as described above, a pattern is inserted into a video signal at the transmit end during an encoding, and, when the phase of the frequency of the inserted pattern is detected during a decoding at the receive end, and when a comparison is made to determine whether the original phase lies at the front or at the rear, a comparison is made not with an exact value, but with a predetermined range of values by taking into account the delay values of the delaying devices. Here, the sum total of the delays of the delaying devices DE1-DE20 includes one clock period, so that clocks having a relatively exact phase can be generated when comparing the pattern which is inserted during an encoding.

Further, according to the present invention, a pattern is inserted into a part having no video signals during an encoding, and a phase compensation is carried out during a decoding by utilizing the inserted pattern. In carrying out such a phase compensation, even the delay values of the delaying devices and even the temperature characteristics are taken into account, so that clocks having a relatively exact phase are generated, and errors are reduced in processing the signals.

What is claimed is:

1. A phase compensating circuit of a signal processing system for compensating a phase of clock signals during a decoding by utilizing a pattern inserted during an encoding, the circuit comprising:

pattern recognizing means for recognizing the pattern inserted during the encoding;

code converting means connected to said pattern recognizing means, for outputting signals received from said pattern recognizing means in the form of signless signals;

comparing means for sampling the output signal of said code converting means and comparing the magnitudes of time-adjacent ones of said samples and positive or negative threshold values, and generating lead or lag pulses according to the comparison;

clock adjustment controlling means connected to said comparing means, for providing clock lagging or clock leading signals after counting the lead or lag pulses of said comparing means; and clock adjusting means connected to said clock adjustment controlling means, for adjusting the phase of the clock signals by utilizing delaying devices in accordance with the clock leading or clock lagging signals of said clock adjustment controlling means.

2. The phase compensating circuit as claimed in claim 1, wherein said pattern recognizing means comprises a plurality of adders.

3. The phase compensating circuit as claimed in claim 1, wherein said comparing means comprises:

comparing arithmetic means for determining and comparing the magnitudes of said time-adjacent samples, and the magnitudes of said positive or negative threshold values; and pulse generating means connected to said comparing arithmetic means, for generating lead or lag pulses in accordance with the compared results of said comparing arithmetic means.

4. The phase compensating circuit as claimed in claim 3, wherein said comparing arithmetic means compares the magnitudes of two of said time-adjacent samples A and B in such a manner that, if the compared value comes within a predetermined range of the frequencies of the patterns inserted during the encoding, then the magnitudes of the samples A and B are accepted to be proper by taking into account a worst case of the delaying devices of said clock adjusting means.

5. The phase compensating circuit as claimed in claim 3, wherein said comparing arithmetic means comprises:
 a plurality of D flip-flops for delaying input data in accordance with an input clock;
 first comparing means connected to said D flip-flops, for comparing magnitudes of outputs from said D flip-flops;
 a subtracter connected to more than one of said D flip-flops, for obtaining the difference of outputs from said more than one of said D flip-flops;
 absolute representing means connected to said subtracter, for obtaining the absolute value of an output from said subtracter; and
 second comparing means connected to said absolute representing means, for comparing an output from said absolute representing means with a reference value.

6. The phase compensating circuit as claimed in claim 1, wherein said clock adjusting means comprises a plurality of delaying devices and a plurality of multiplexers and produces a plurality of clocks having different phases, and provides clocks corresponding to the clock leading or clock lagging signals of said clock adjustment controlling means.

7. The phase compensating circuit as claimed in claim 6, wherein the sum total of the delays of said delaying devices is greater than or equal to one clock cycle by taking a best case and the temperature characteristics of said delaying devices.

* * * * *